(12) United States Patent
Vogt et al.

(10) Patent No.: US 7,080,722 B2
(45) Date of Patent: Jul. 25, 2006

(54) MULTIPLE CLUTCH SYSTEM, PARTICULARLY A DOUBLE CLUTCH SYSTEM

(75) Inventors: Sebastian Vogt, Bad Neustadt (DE); Andreas Orlamünder, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/491,029

(22) PCT Filed: Sep. 27, 2002

(86) PCT No.: PCT/EP02/10878

§ 371 (c)(1),
(2), (4) Date: Mar. 29, 2004

(87) PCT Pub. No.: WO03/029677

PCT Pub. Date: Apr. 10, 2003

(65) Prior Publication Data

US 2004/0238307 A1    Dec. 2, 2004

(30) Foreign Application Priority Data

Sep. 28, 2001    (DE) ................................ 101 48 176
Jul. 30, 2002    (DE) ................................ 102 34 548

(51) Int. Cl.
*F16D 21/06*    (2006.01)
*F16D 13/75*    (2006.01)
(52) U.S. Cl. ................. 192/48.8; 192/70.25; 192/111 A
(58) Field of Classification Search ............... 192/48.9, 192/48.91, 70.25, 87.11, 111 A
See application file for complete search history.

(56) References Cited

U.S. PATENT DOCUMENTS

| | | | | |
|---|---|---|---|---|
| 2,757,557 A | * | 8/1956 | Hoffman | .................. 475/131 |
| 3,185,274 A | | 5/1965 | Maurice | |
| 4,966,270 A | * | 10/1990 | Rispeter et al. | .......... 192/87.15 |
| 5,711,409 A | * | 1/1998 | Murata | .................... 192/87.11 |
| 6,464,059 B1 | * | 10/2002 | Kundermann et al. | ... 192/87.11 |
| 6,722,483 B1 | * | 4/2004 | Damm et al. | .............. 192/48.8 |
| 6,808,054 B1 | * | 10/2004 | Hirt et al. | ................. 192/87.11 |
| 6,814,205 B1 | * | 11/2004 | Feldhaus et al. | ........... 192/48.9 |
| 6,830,140 B1 | * | 12/2004 | Zink et al. | .................. 192/48.9 |

FOREIGN PATENT DOCUMENTS

| | | |
|---|---|---|
| DE | 197 03 333 A1 | 8/1998 |
| DE | 199 34 853 A1 | 2/2001 |
| FR | 1.036.741 | 9/1953 |

* cited by examiner

Primary Examiner—Saul Rodriguez
(74) Attorney, Agent, or Firm—Cohen, Pontani, Lieberman & Pavane (57) ABSTRACT

A multiple clutch system, particularly a double clutch system, includes a housing arrangement connectable to a drive element and rotatable therewith about an axis of rotation. The clutch system include a first coupling area and a second coupling area. The first coupling area includes a first pressure plate for pressing a friction area of a first clutch disc against an abutment area, the first pressure plate being rotatable with the housing arrangement, and first actuator device for activating the first coupling area to execute controlling operations. The second coupling area includes a second pressing plate for pressing a friction area of a second clutch disc against an abutment area, the second pressure plate being rotatable with the housing arrangement, and a second actuator device for activating the second coupling area to execute controlling operations. The first actuator device and/or the second actuating device is designed for generating an actuating force that acts upon the respectively assigned coupling area in the direction of engagement.

16 Claims, 3 Drawing Sheets

MULTIPLE CLUTCH SYSTEM, PARTICULARLY A DOUBLE CLUTCH SYSTEM

PRIORITY CLAIM

This is a U.S. national stage of application No. PCT/EP02/10878, filed on 27 Sep. 2002. Priority is claimed on that application and on the following application(s): Country: Germany, Application No.: 101 48 176.4, Filed: 28 Sep. 2001; Country: Germany, Application No.: 102 34 548.1, Filed: 30 Jul. 2002.

BACKGROUND OF TILE INVENTION

1. Field of the Invention

The present invention pertains to a multiple clutch arrangement, especially to a dual clutch arrangement, which can, for example, be used for the transmission of torque in the drive train of a motor vehicle.

2. Description of the Prior Art

Drive systems which are required to transmit very high torques, that is, in the drive systems used in trucks, for example, but also to an increasing extent in passenger vehicles, include gearboxes with two gearbox input shafts, which are basically coaxial with respect to each other. The various gears of the gearbox then transmit the torque from one or another of these input shafts to an output shaft. Each of the input shafts is connected nonrotatably to a clutch disk, and torque is intbaruced into the gearbox via the one or the other of these input shafts, depending on which of the clutch disks has been frictionally engaged in the clutch and thus held nonrotatably with respect to the drive shaft such as a crankshaft. Energy storage devices, usually designed as diaphragm springs, are used in these clutches to pretension the clutch disks toward the engaged position. Each of the various clutch areas of a multiple clutch arrangement of this type, e.g., a dual clutch arrangement, has its own actuator such as a master and slave cylinder system, for example, to ensure that the clutch areas are operated in coordination with each other, that is, so that torque can be transmitted via one of the clutch areas while the other clutch area is held open and is not used to transmit any torque.

Systems of this type suffer from the problem that their actuation is comparatively imprecise, especially during the clutch-engaging operation, which means that it is extremely difficult to increase the engaging force in a precisely defined manner. There is also the problem that, if the actuators used to disengage the clutches break down, both clutch areas of the dual clutch can be held in the engaged state. If, in this situation, one of the gears in the gearbox cannot be disengaged because of, for example, heavy loads or possibly because of another malfunction, the drive train of a vehicle equipped with a system of this type would be locked, and the vehicle could no longer be towed. This could be the situation, for example, when, at a certain moment, torque is being or is to be transmitted in the gearbox via one of the gearbox input shafts, while at the same time a gear has already been engaged for the other gearbox input shaft in preparation for a shift of gears by a following changeover of the dual clutch from one clutch area to the other.

SUMMARY OF THE INVENTION

An object of the present invention is to provide a multiple clutch arrangement, especially a dual clutch arrangement, which makes it possible for the clutches to be actuated more precisely and which also ensures a high degree of operating safety, especially in the event of malfunctions.

According to the present invention, this task is accomplished by a multiple clutch arrangement, especially a dual clutch arrangement, comprising a housing arrangement, which is or can be connected to a drive element for rotation in common around an axis of rotation;

a first clutch area with a first pressure plate, by which a friction area of a first clutch disk can be pressed against an abutment area, which can rotate along with the housing arrangement, and with a first actuator device, by which the first clutch area can be activated to implement actuating operations; and a second clutch area with a second pressure plate, by which a friction area of a second clutch disk can be pressed against an abutment area, which can rotate along with the housing arrangement; and with a second actuator device, by which the second clutch area can be activated to implement actuating operations;

where the first actuator device and/or the second actuator device is designed to pbaruce an actuating force which acts on the associated clutch area in the clutch-engaging direction.

Because, according to the present invention, at least one of the clutch areas, but preferably both clutch areas, are therefore not under the pretension of an energy storage device acting in the clutch-engaging direction but rather must be brought actively into the engaged state by the appropriate operation of the actuator devices assigned to the clutch areas in question, it is possible for the actuator devices assigned to the clutch areas to be operated in such a way that they deliver the precise engaging force required for a specific operating state without being influenced during this process by an energy storage device, the operating characteristics of which can change over the course of their service lives, for example. If a malfunction occurs in one of the actuator devices, furthermore, it is also ensured that the clutch area in question is not forced to engage but arrives instead in a state in which it is essentially unable to transmit any torque. This is important, especially when one of the actuator devices malfunctions while the vehicle is being driven. It is also assumed here that the drive power or the drive torque is being transmitted via one of the gearbox input shafts at the same time that a gear has already been engaged on the other shaft in preparation for a gearshift operation. If one of the actuator devices were to malfunction under these conditions, i.e., a malfunction that would lead to a situation in which both clutch areas of the dual clutch are forced into a torque-transmitting state, the effect would be to create a complete force feedback loop in the clutch-gearbox system, which would lock up the entire system. This would usually cause considerable damage to the gearbox. The present invention, however, ensures that a clutch-engaging force and thus a torque-transmitting state can be achieved only by means of the defined operation of one of the actuator devices; that is, it can be achieved only when the actuator device is functioning correctly. It is therefore impossible for multiple clutch areas to be forcibly engaged simultaneously.

For example, it is possible in the multiple clutch arrangement according to the invention for the first clutch area and/or the second clutch area to have a transmission lever arrangement, the first lever arrangement being actuated by the first actuator device and/or the second by the second.

These lever arrangements are supported at one end against the housing arrangement and at the other end against the associated pressure plate.

According to another advantageous aspect of the present invention, it is possible for the transmission lever arrangement of one of the clutch areas to be supported against the housing arrangement in an area radially outside the point where it is supported against the pressure plate, and for the transmission lever arrangement of the other clutch area to be supported against the housing arrangement in an area radially inside or outside the point where it is supported against the pressure plate. As a result, the one transmission lever arrangement transmits its force, i.e., the actuating force, in a direction different from that of the other transmission lever arrangement. This means that the actuator devices can exert the actuating forces on the two transmission lever arrangements in the same direction in order to engage the associated clutch areas. This makes it easier to design a compact actuator system.

In the multiple clutch arrangement according to the invention, furthermore, it is possible to provide at least one transmission element in the other clutch area by means of which the transmission lever arrangement is supported against the pressure plate.

So that the space available can be utilized as efficiently as possible, it is proposed that one of the transmission lever arrangements be supported against an inside surface of the housing arrangement and that the other transmission lever arrangement be supported against an outside surface of the housing arrangement.

It is also possible and indeed preferable for the transmission lever arrangement of the other clutch area to be supported against the outside surface of the housing arrangement.

A very compact design of a multiple clutch arrangement according to the invention can be obtained by providing the housing arrangement with a first housing area, which can be connected to the drive element, and with a second housing area, which can support at least one of the transmission lever arrangements. The design can be simplified even more by connecting the abutment plate, which provides the abutment area for the first clutch area and also the abutment area for the second area, to the first and second housing areas.

Even if, as explained above, the especially advantageous measures implemented in the multiple clutch arrangement according to the invention ensure that both actuator devices act in the same direction, it is preferably provided according to another advantageous aspect of the invention, specifically in conjunction with the redirection of the forces made possible by the transmission lever arrangements, that the first pressure plate and the second pressure plate can be actuated in the opposite axial direction by their assigned actuator devices. This combination of features also leads to a very compact design.

Alternatively, it is possible for the first and second pressure plates to be actuated by their assigned actuator devices in the same axial direction. In contrast to the previously described embodiment, according to which the actuating forces move the two pressure plates in opposite direction to arrive in their engaged states, in this embodiment the forces exerted on the pressure plates move them in the same direction, so that, in a corresponding manner, the abutment area will also have sections facing in the same axial direction to support the associated pressure plates or clutch areas.

In friction clutches of this type, there is usually the problem that the thickness of the friction linings provided in the area of the clutch disks decreases over the course of time.

As a result of this decrease in thickness, the various pressure plates move closer to their assigned abutment areas, and the transmission lever systems also change their positions accordingly. To ensure that no wear-induced changes occur in the operating or disengaging characteristics of the various clutch areas, it is proposed that at least one of the actuator devices act on the associated clutch area, preferably on the pressure plate of this clutch area, by way of a wear take-up device.

A wear take-up device which is very simple to realize but which also operates very precisely can comprise:
   at least one adjusting element which can shift relative to the pressure plate during the wear take-up process;
   a first detection element, which is stationary with respect to the housing arrangement;
   a second detection element, which is held on the pressure plate and which, upon the occurrence of wear, can be deflected relative to the pressure plate by cooperation with the first detection element; and
   an arresting element, by means of which the second detection element can be locked in its wear-induced, deflected position relative to the pressure plate, where, upon the occurrence of wear and thus upon the deflection of the second detection element, the arresting element can be shifted relative to the pressure plate and relative to the second detection element, and where an adjusting movement of the minimum of one adjusting element can be limited by the second detection element and/or by the arresting element.

The second detection element can be in the form of a leaf spring and can be attached at one end to the pressure plate.

It can also be provided that, upon the occurrence of wear, at least part of the length of the second detection element moves away from the pressure plate; that the arresting element is designed in the form of a wedge; and that, by means of pretension, the wedge-like arresting element is pretensioned into the intermediate space formed between the pressure plate and the length portion of the second detection element.

A wear take-up characteristic which is uniform around the entire circumference can be easily achieved by designing the minimum of one adjusting element as an adjusting ring, which can rotate relative to the pressure plate around an axis during the course of a wear take-up process.

In an alternative embodiment, it is possible for at least one of the transmission lever arrangements to be supported against the housing arrangement by a wear take-up device.

BRIEF DESCRIPTION OF THE DRAWINGS

The present invention is described in detail below with reference to the attached drawings and on the basis of preferred embodiments.

DETAILED DESCRIPTION OF THE PREFERRED EMBODIMENTS

Figure 1:
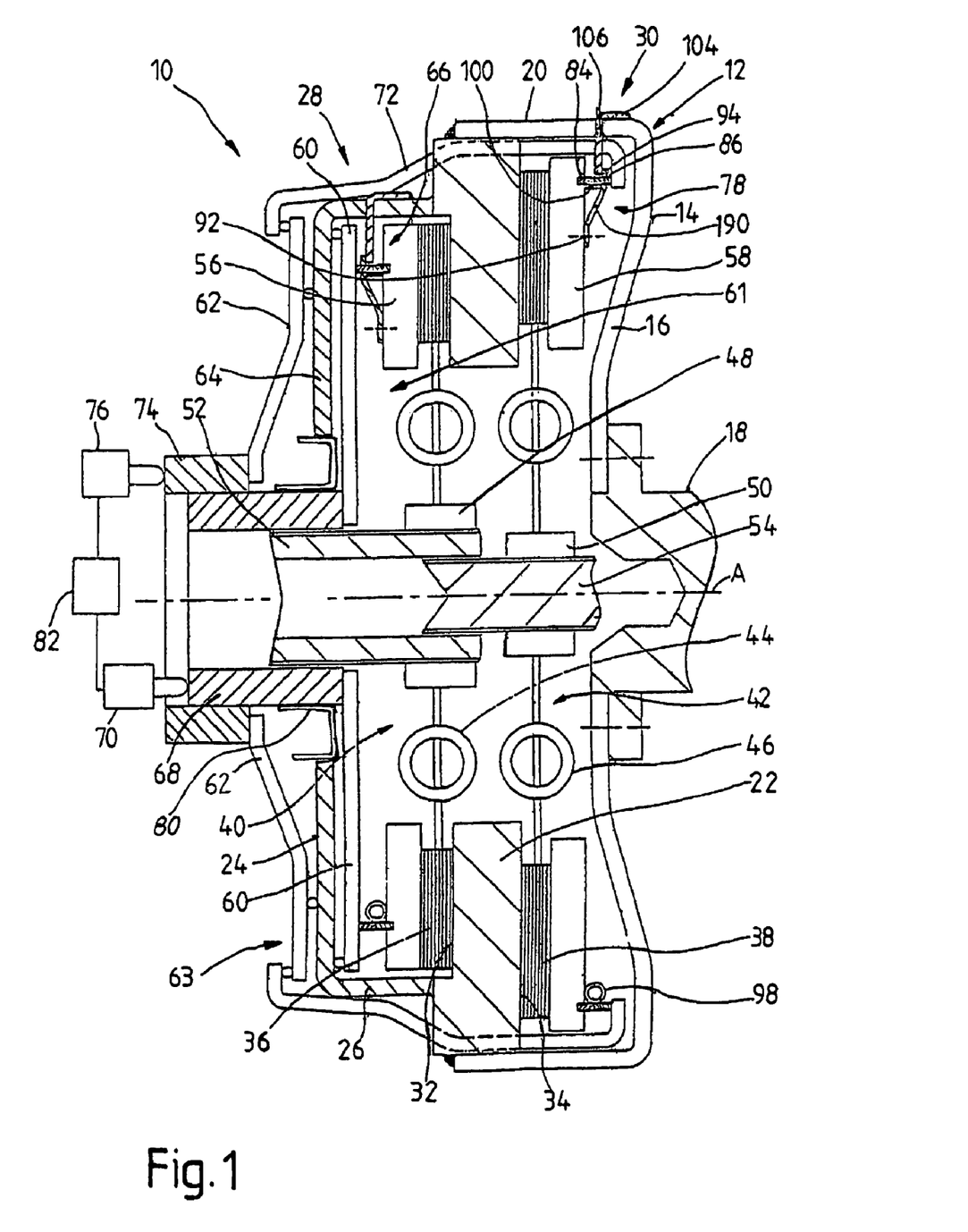
FIG. 1 is a longitudinal cross section, which shows the basic design of a dual clutch arrangement according to the invention.

In FIG. 1, a dual clutch according to the invention is designated overall by the reference number 10. The dual clutch 10 comprises a housing arrangement 12. This housing arrangement 12 in turn comprises an essentially cup-like first housing part 14, which is or can be connected nonrotatably by the radially inner part of its bottom area 16 to a drive shaft 18, such as the crankshaft of an internal combustion engine. In its more-or-less axially oriented edge area 20, the first housing part 14 is permanently connected to the radially outer part of an intermediate plate 22 by means of, for example, a weld. It is possible here, for example, for the edge area 20 to overlap axially the intermediate plate 22 and then for its axial end area to be attached by a welded seam or by several spot welds to the intermediate plate 22. A second housing part 24, which is also essentially in the form of a cup, is also connected permanently to the intermediate plate 22. The radially outer edge area 26, which extends more-or-less in the axial direction of an axis of rotation A, can, for example, be butted up against an endsurface of the intermediate plate 22 or welded to it. As will be explained again below, this connection of the second housing part 24 to the intermediate plate 22 is in an area radially inside the connection of the intermediate plate 22 to the first housing part 14, from which it follows that the second housing part 24 has a smaller diameter than the first housing part 14.

The intermediate plate 22 forms an abutment area for the two clutch areas 28, 30 of the dual clutch 10, and its two axial sides provide the friction surfaces 32, 34, with which the friction linings 36, 38 of two clutch disks 40, 42 can establish frictional contact. The clutch disks 40, 42 can be of conventional design, and each can have, for example, a torsional vibration damper arrangement 44, 46. The hub areas 48, 50 of the clutch disks 40, 42 are connected nonrotatably via sets of wedge-shaped teeth or the like to the gearbox input shafts 52, 54, which are coaxial with respect to each other and with respect to the axis of rotation A, the hubs thus remaining free to move axially with respect to the shafts.

On each of the two sides of the intermediate plate 22, each of the two clutch areas 28, 30 has a pressure plate 56, 58. The pressure plates 56, 58 are connected to the housing arrangement 12 by tangential leaf springs, for example, in the manner conventionally used for friction clutches in such a way that, between the pressure plates 56, 58 and the housing arrangement 12, there is an essentially nonrotatable connection, but a connection which allows the pressure plates 56, 58 to move axially to at least a slight extent relative to the housing arrangement 12 and thus also relative to the intermediate plate 22. When these types of tangential leaf spring arrangements or some other type of elastic pretensioning arrangements are used, furthermore, it is possible for them to produce simultaneously the force required to disengage the pressure plates 56, 58. This means that the pressure plate 56 of the first clutch area 28 is pushed away from the intermediate plate, i.e., toward the left in FIG. 1, whereas the pressure plate 58 of the clutch area 30 is pushed away from the intermediate plate or toward the right in FIG. 1.

Each of the clutch areas 28, 30 also has its own transmission lever arrangement 61, 63, each of which has at least one transmission lever 60, 62. It is preferable to provide several of these transmission levers 60, 62 and to distribute them around the circumference. The two transmission lever arrangements 61, 63 or their transmission levers 60, 62 are supported in each case against a bottom area 64 of the cup-like second housing part 24. It can be seen that the transmission levers 60 of the transmission lever arrangement 61 assigned to the first clutch area 28 are supported in their radially outer area against the housing part 24, whereas, in an area located farther inward in the radial direction, they act via a wear take-up device 66, to be described in greater detail further below, on the pressure plate 56 of the first clutch area 28. In their radially inner area, these same transmission levers 60 of the transmission lever arrangement 61 are then actuated by an actuator device 70, assigned to the first clutch area 28, acting by way of an engaging bearing 68. When the actuator device 70 produces the actuating force, therefore, a force, acting via the engaging bearing 68, is exerted on the transmission levers 60, the radially inner ends of which are thus pushed toward the drive shaft 12. Because of the lever ratios, the levers 60, acting via the wear take-up device, push the pressure plate 56 toward the intermediate plate 22, so that the friction linings 36 of the clutch disk 40 are clamped between this pressure plate 56 and the intermediate plate 22 in order to engage the clutch.

The transmission levers 62 of the transmission lever arrangement 63 assigned to the second clutch area 30 are supported in their radially outer area on one or more hold-down bars 72, which are distributed circumferentially around the axis of rotation A. Radially inside this support point, the transmission levers 62 are supported on the bottom area 64 of the second housing part 24. In their radially inner area, these transmission levers 62 are actuated by an actuator arrangement 76 assigned to the second clutch area 30, acting by way of an engaging bearing 74. When this actuator arrangement 76 pbaruces an actuating force, the radially inner areas of the transmission levers 62 are also pushed toward the drive shaft 18, so that, as a result of the corresponding lever ratios and the positioning of the various support points, the radially outer areas of the levers 62 and thus also the hold-down bars 72 are moved away from the drive shaft 18. As can be seen in FIG. 1, the axial end areas of the hold-down bars 72 facing away from the transmission levers act via a wear take-up device 78 on the pressure plate 58 of the second clutch area 30. When this force is exerted, the pressure plate 58 is pushed or pretensioned toward the intermediate plate 22, so that the friction linings 38 of the clutch disk 42 are clamped between the intermediate plate 22 and the pressure plate 58.

As suggested in FIG. 1, openings can be provided in the intermediate plate 22 at various points around the circumference in the radially outer area; the hold-down bars 72 can then be guided with freedom of axial movement in these openings. As a result of the overlap between the edge area 20 and the intermediate plate 22, these openings can be closed off radially on the outside to prevent the hold-down bars 72 from shifting radially outward by centrifugal force. The hold-down bars 72 can also be designed as sheet metal parts like the various transmission levers 60, 62, although care must be taken to ensure that they are able to absorb essentially without deformation the various forces which act on them when they are transmitting the clutch-engaging forces. The transmission levers 60, 62 can be supported against the housing part 64 and the hold-down bars 72 by special support elements such as inserted wire rings or the like. It is obvious that there are many ways in which such support can be provided so that relative displacement is allowed. For example, appropriate formations can also be provided on the second housing part 24 and/or on the various transmission levers 60, 62 and/or on the hold-down bars 72. It is also possible for the various transmission levers 60, 62 of the respective transmission lever arrangements to be connected to each other, in which case, however, care must be taken to ensure that the transmission levers are still able to execute the required swiveling movement. This connection could be accomplished, for example, by stamping all of the transmission levers 60, 62 of one of the transmission lever arrangements 61, 63 out of a single piece of sheet metal in such a way that remaining web areas connect the individual transmission levers to each other. To avoid forces that cause deformation, this connection can be provided in the radial area where the levers are also supported on other components, such as on the second housing part 24. It should also be pointed out that the engaging bearing 68 assigned to the first clutch area 28 can be guided on the second housing part 24 by way of a bearing 80, which allows axial displacement.

As for the two actuator devices 70, 76, it should be mentioned that they can be designed as master cylinder/slave cylinder systems, for example, and can be coaxial with respect to each other to save space. A control system 82 assigned to the two actuator devices 70, 76 ensures that each of the two clutch areas 28, 30 is subjected by its assigned actuator device 70, 76 in a coordinated manner to its own defined engaging force, so that a changeover from torque transmission by one of the gearbox input shafts 52, 54 to torque transmission by the other can always be accomplished even under load. It is obviously possible to use other types of actuator devices here such as worm drives or other mechanical systems, each of which has its own drive unit and each of which can bring the various clutch areas 28, 30 into the desired state in response to the appropriate control commands.

In the case of the dual clutch shown in FIG. 1, therefore, one of the clutch areas 28, 30 is engaged by commanding one of the actuator devices 70, 76 to produce a clutch-engaging force. No energy storage devices are present to pretension the various clutch areas 28, 30 toward a state of engagement. Instead, the previously described disengaging force-producing systems, such as tangential leaf springs or the like, ensure that the pressure plates 56, 58 and thus also the various clutch areas 28, 30 are always basically disengaged unless an engaging force is produced specifically by the individually assigned actuator devices 70, 76. This excludes the possibility that, for example, in the event of a malfunction of one of the actuator devices, a state could occur in which both clutch areas 28, 30 are able to transmit torque simultaneously, which could lead to considerable damage to the gearbox if gears are engaged on both gearbox input shafts 52, 54. Another advantage of the design of a dual clutch according to the invention is that the clutch-engaging force can be applied in an appropriately controlled manner by the actuator devices 70, 76, which in general can be operated in a very precise and controlled manner. As a result, very precisely executed clutch-engaging processes can be accomplished, there being no need to work against the powerful and therefore difficult-to-calculate force of an energy storage device.

As previously explained, each of two clutch areas 28, 30 has its own wear take-up device 66, 78. The essential task of these wear take-up devices 66, 78 is to compensate for the wear-induced decrease in the thickness of the various frictionally interacting components. This type of thickness decrease will occur primarily in the area of the friction linings 36, 38. This loss of thickness would have the result that, in the engaged state, the pressure plates 56, 58 would be positioned closer to the intermediate plate 22 and accordingly also that the transmission levers 60, 62 would change their position in comparison with the state unaffected by wear. As will be described in detail below, the wear take-up devices 66, 78 increase their axial dimension upon the occurrence of wear, so that the wear-induced loss of thickness which occurred previously can be compensated and preferably compensated with precision.

The two wear take-up devices 66, 78 are essentially identical to each other in terms of their design and the way in which they work mechanically. The detailed design is therefore described in detail below with reference to the wear take-up device 78 assigned to the second clutch area 30. The same explanation will then also apply, of course, to the wear take-up device 66 of the first clutch area 28.

The wear take-up device 78 comprises two adjusting rings 84, 86, which are essentially concentric with respect to the axis of rotation A. The adjusting ring 84 lies against the pressure plate 58 and is guided, for example, in a circumferential groove. The adjusting ring 86, as will be described in greater detail below, rests on the adjusting ring 84 and is acted upon by the hold-down bars 72 (by the transmission levers 60 in the case of the first clutch area 28). As can be seen in the radial view of FIG. 2, the two adjusting rings 84, 86 have complementary ramp areas 88, 90, extending essentially in the circumferential direction, at several points around their circumference. A relative circumferential rotation of the two adjusting rings 84, 86 relative to each other, to be described again below, causes the ramp areas 88, 90 to slide along each other, with the result that the overall size of the assembly comprising the two adjusting rings 84, 86 changes.

In addition, the wear take-up device 78 has a detection element 190 (FIGS. 1 and 2), which is designed essentially in the form of a leaf spring. One end area 92 of this detection element 190 is attached to the pressure plate 58, whereas the other end area 94 extends over the adjusting ring 86. For this purpose, the adjusting ring 86 has a recess 96 in the circumference that is open in the axial direction, the length of this opening in the circumferential direction being approximately the same as the circumferential extent of the end area 94 of the detection element 190. Because the detection element 190 is basically fixed in position with respect to the pressure plate 58, that is, because it cannot move in the circumferential direction relative to the pressure plate 58, the adjusting ring 86 is also prevented from moving in the circumferential direction. In contrast, there is nothing to prevent the adjusting ring 84 from rotating in the circumferential direction, that is, from turning relative to the pressure plate 58 around the axis of rotation A. A pretensioning spring 98 is also provided, one end of which acts on the adjusting ring 84, while the other end acts on the adjusting ring 86, i.e., on pressure plate 58, in such a way that adjusting rings 84, 86 are pretensioned with respect to each other for relative rotation in the circumferential direction. The direction of this pretensioning force is such that, in a situation in which rotation could occur, the cooperation between the two ramp areas 88, 90 would cause the overall axial dimension of the assembly comprising the two adjusting rings 84, 86 to increase.

The wear take-up device also has an arresting slide 100, which is located in the area radially inside the adjusting rings 84, 86 and which is supported against them in the radially outward direction. It can be seen in FIG. 2 that the arresting slide 100 has a wedge-like shape and is supported on one side against the pressure plate 58 and on the other side against the detection element 190 and therefore fills the space present between these two elements. As a result of the pretensioning spring 102, the arresting slide 100 is pretensioned to move in the circumferential direction "r", this being the same direction in which the adjusting ring 84 is also pretensioned to move by the spring 98. It is advantageous for the part of the pretensioning spring 102 not acting on the arresting slide 100 to be connected to the adjusting ring 84 or to the end of the pretensioning spring 98 connected to the ring. The advantage of this is that, because the two components, i.e., the adjusting ring 84 and the arresting slide 100, move in the same direction R, r, the pretensioning force provided for the arresting slide 100 can be kept the same regardless of the extent to which wear has already been compensated.

Another detection element 104 is provided on the housing arrangement 12; this element passes through an opening, for example, in the first housing part 14 and has a blocking section 106, which projects radially inward. This blocking section 106, also indicated schematically in FIG. 2, of the detection element 104 overlaps in the radial and circumferential directions the radially outer end area 94 of the detection element 90.

Figure 2:
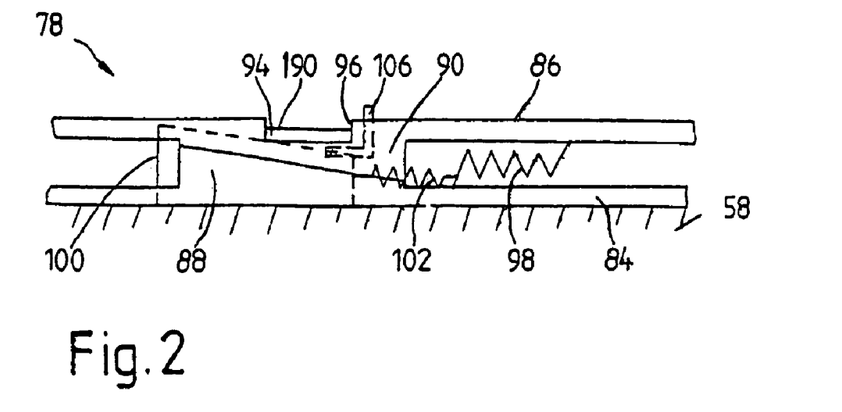
FIG. 2 shows a schematic diagram of a wear take-up device in the state before the occurrence of wear, seen radially from the outside.
Figure 3:
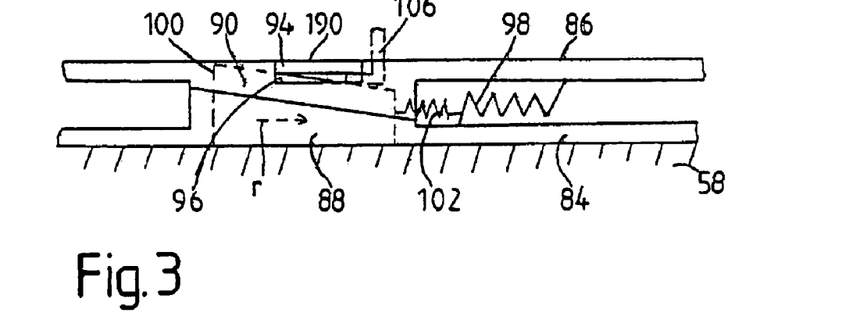
FIG. 3 shows the wear take-up device of FIG. 2 in a state after the occurrence of wear, but before the performance of a wear-compensation process.
Figure 4:
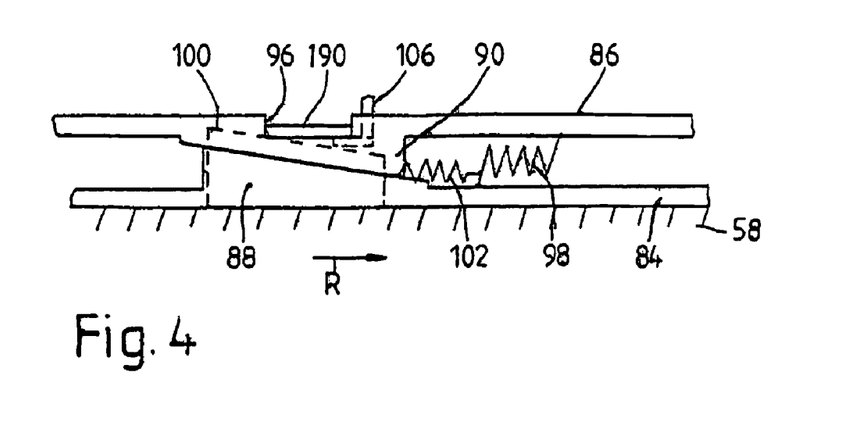
FIG. 4 shows the wear take-up device according to FIGS. 2 and 3 after the wear-compensation process has been completed.

The way in which this wear take-up device 78 works to compensate for the wear of the friction linings 38 that occurs during operation, is described in the following. Reference will be made primarily to FIGS. 2–4.

FIG. 2 shows the state in which the various components of the wear take-up device 78 find themselves when the dual clutch 70 is new, that is, when essentially no wear has yet occurred in the area of the friction linings 38. The end area 94 of the detection element 90 is a short axial distance away from the blocking section 106 of the detection element 104. The end area 94 of the detection element 90 is also exerting a force on the two adjusting rings 84, 86 in the axial direction in such a way that the pretensioning force being exerted by the spring 98 cannot cause the two adjusting rings 84, 86 to rotate relative to each other. The pretensioning force being exerted by the spring 102 cannot cause the arresting slide 100 to move either.

When wear now occurs during operation, the pressure plate 58 moves closer to the intermediate plate 22. Thus the end area 94 of the detection element 190 also approaches the blocking section 106 of the detection element 104, until these two components finally come to rest against each other. Because the pressure plate 58, when in the engaged position, has shifted its position with respect to the housing arrangement 12 and thus also with respect to the blocking section 106, a further increase in the amount of wear has the result that, as can be seen in FIG. 3, the end area 94 of the detection element 190 is held in place axially by the blocking section 106 and is thus lifted from the adjusting ring 86 but preferably continues to engage at least partially in the circumferential recess 96. Simultaneously with this displacement or deflection of the detection element 190 with respect to the pressure plate 58, the arresting slide 100 acquires the ability to move in the circumferential direction under the pretensioning effect of the pretensioning spring 102, which movement accompanies the deflection of the detection element 190. This means, even after the wear-induced deflection of the detection element 190 with respect to the pressure plate 58, the arresting slide 100 still fills the intermediate space formed between the end area 94 of the detection element 190 and the pressure plate 58 and thus prevents the detection element 190 from returning to its original position under the effect of its own elasticity.

As long as an engaging force is being applied by the actuator device 76 for the second clutch area 30, the lifting of the detection element 90 from the adjusting ring 86 in the axial direction cannot lead to any relative rotation of the two adjusting rings 86, 84 with respect to each other. But if the clutch area 30 is to be disengaged and the force being exerted by the actuator device 76 is therefore reduced or eliminated, the powerful force being exerted on the adjusting ring 86 by the hold-down bars 72 will disappear as well. The only force component still in effect will then be that produced by the disengaging force-producing arrangement, which pretensions the pressure plate 58 and thus the adjusting ring 86 toward the hold-down bars 72. But because there is essentially no force acting in opposition to this force component, the two adjusting rings 84, 86 can in this state execute relative circumferential movement with respect to each other under the action of the spring 98, during which movement the adjusting ring 86 does not turn relative to the pressure plate 58, but rather the adjusting ring 84 rotates circumferentially relative to the pressure plate 58. As a result of the cooperation between the ramp areas 88, 90, this relative rotational movement leads to the situation that, as can be seen in FIG. 4, the adjusting ring 86 shifts axially with respect to the pressure plate 58, that is, moves away from it. This displacement continues until the circumferential recess 96 in the adjusting ring 86 makes contact again with the detection element 190. At this moment, the rotational movement of the adjusting ring 84 in direction R also stops. The wear previously detected by the displacement of an area of the detection element 190 with respect to the pressure plate 58 is now completely compensated. It is important to note here that the extent to which the detection element 190 has been lifted from the adjusting ring 86 is essentially exactly the same as the extent to which the thickness of the friction linings 38 or of other frictionally interacting areas has decreased. In the state shown in FIG. 4, the assembly formed by the friction linings 38, the pressure plate 58, and the wear take-up device 78 now has essentially the same overall axial dimension again that it had when new, so that, as far as the actuator arrangement 76 is concerned, there is no perceptible change in the thickness of the friction linings 38.

The wear take-up device 78 is of very simple design, but allows wear to be compensated in a very precise manner. It should be pointed out that the take-up limiting function, which, as previously described, is accomplished in the present example by the detection element 190, which also serves to detect the amount of wear, can obviously also be carried out by the arresting slide 100. This can be provided with, for example, a radially outward-pointing projection, which engages in an assigned circumferential recess in the adjusting ring 84. This circumferential recess in the adjusting ring 84 will be larger in the circumferential direction than the projection on the arresting slide 100. When wear occurs, the arresting slide 100 shifts in the circumferential direction and thus also shifts with respect to the adjusting ring 84. During a subsequent clutch-disengaging process, this ring can then shift in the circumferential direction with respect to the adjusting ring 86—as a result of the absence of any blocking action—until the circumferential edge of its circumferential recess comes into contact with the radially outward-pointing projection of the arresting slide 100. This design offers the advantage that the design of the wedge-like arresting slide 100 can be used to exert a certain influence on the extent of the compensation. Thus, a relatively flat wedge-like design has the result that a small amount of wear will allow the arresting slide 100 to move comparatively far in the circumferential direction and the adjusting ring 84 to rotate by a corresponding amount, which leads to excessive wear compensation, that is, to overcompensation. A steeper wedge-like design leads in a corresponding manner to undercompensation. These effects can be exploited as desired. In addition, the two detection elements 190 and 104 can have shapes different from those shown in the figures and can be located in different positions. For example, the detection element 90 could extend more-or-less in the circumferential direction, and the end not attached to the pressure plate 58 could have an area that extends over the adjusting rings 84, 88 in the radial direction.

Because, in the dual clutch according to the invention, each of the two clutch areas 28, 30 has its own, independently-acting wear take-up device 66, 78, both of which, as described above, can be designed in essentially the same way and can have the same operating characteristics, it is possible to provide uniform clutch characteristics for both clutch areas over their entire service lives. There is no need to make any modifications to the various actuator devices 70, 76.

Figure 5:
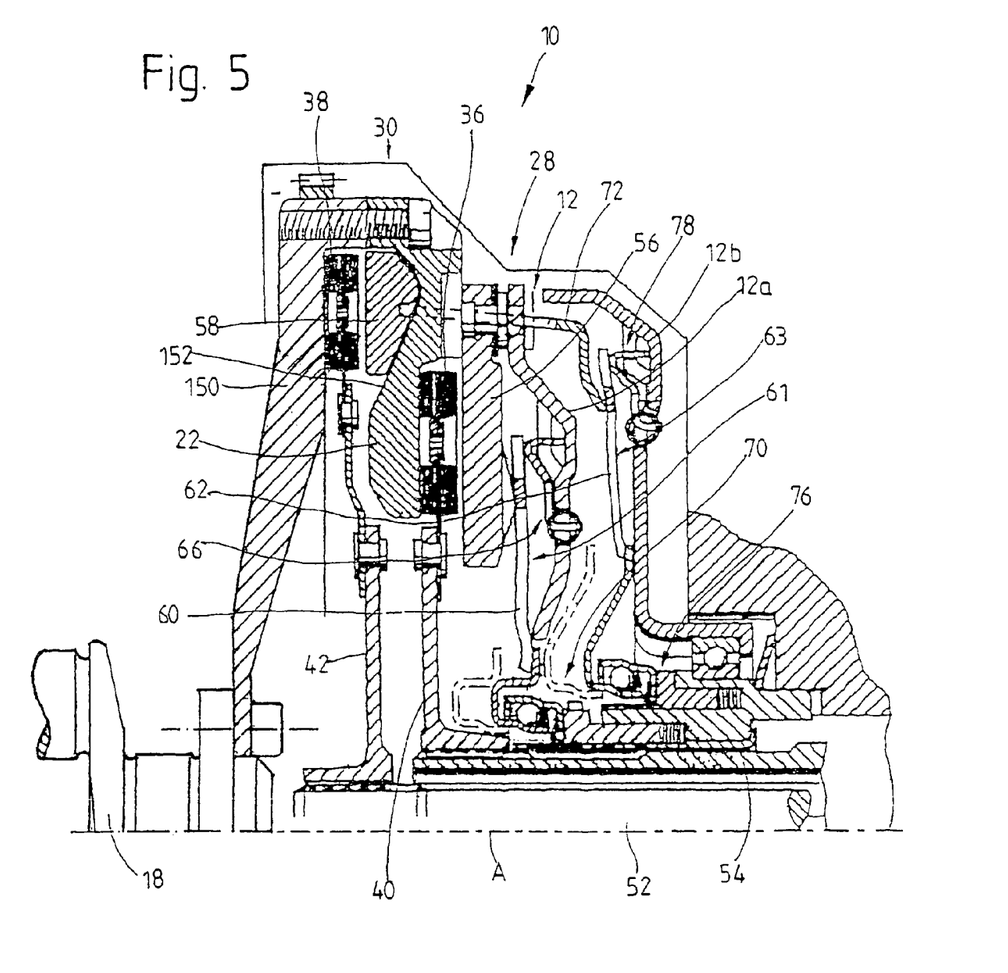
FIG. 5 shows a partial longitudinal cross section through a dual clutch of an alternative design.

FIG. 5 shows an alternative embodiment of a dual clutch 10 according to the invention. This dual clutch 10 is also designed essentially in such a way that the pressure plates 56,58 in the two clutch areas 28, 30 are pretensioned in the engaging direction by their assigned transmission lever arrangements 61, 63, i.e., by the transmission levers 60, 62 of those arrangements, and by the actuator arrangements 70, 76, which are designed here as slave cylinder systems. It should be mentioned in this context that the transmission lever arrangements 61,63 can also comprise lever elements which are connected integrally to each other by a ring-like area and which are stamped out of a piece of steel; these lever elements can thus also act in the manner of a diaphragm spring, in that they are pretensioned in the disengaging direction and then, in opposition to their own pretension, are acted on by the actuator arrangements 70, 76 in the engaging direction so that the actuating effect of the actuator arrangements 70, 76 can be transmitted to the assigned pressure plates 56, 58.

Although it is true that, in the embodiment shown in FIG. 5, one of the two pressure plates 56, 58 is located on each side of the intermediate plate 22, the intermediate plate 22 now forms an abutment only for the clutch area 28, i.e., for the pressure plate 56 of that area. The intermediate plate 22 is connected in its radially outer area by screw bolts or the like to another plate part 150, which is connected radially on the inside to the shaft 18. This plate part 150 now forms the abutment for the second clutch area 30. It can be seen that the pressure plate 58 of that area is held in a recess 152 in the intermediate plate 22, where a force-transmitting element 72 can push it toward the plate part 150 and the clutch disk 42. So that they can be engaged, the two pressure plates 56, 58 are therefore actuated in the same axial direction by their respective actuator arrangements 70, 76, operating by way of the transmission lever arrangements 60, 61 and, in the case of the clutch area 30, also by the force-transmitting element 72. The overall abutment area of this arrangement is therefore formed essentially by the two plates 22, 150, which, because they are connected to each other at their radially outer edges, ultimately also form a housing-like configuration. The actuating force of the force-transmitting element is transmitted to the pressure plate 58 by several projections, following each other in a row around the circumference, which pass through openings provided for them in the various components.

It can also be seen in FIG. 5 that the housing arrangement 12 here comprises two housing parts 12a and 12b. In its radially outer area, housing part 12a is connected at several circumferential points, for example, to the intermediate plate 22 and thus also to the plate part 150—in general, therefore, to the abutment area of the dual clutch. The transmission lever arrangement 61 of the clutch area 28 is supported against the housing part 12a by way of a wear take-up device designated overall by the number 66 in an area radially outside the point where it is supported against the pressure plate 56. When wear occurs in the area of the clutch disk 40, therefore, not only the pressure plate 56, but also the support point for the transmission lever arrangement 61 shift, so that, in spite of the wear, the installation position of the individual transmission levers 60 remains the same. Only a corresponding adjustment in the area of the actuator device 70 is required.

The housing part 12b is also permanently connected in its radially outer area to the intermediate plate 22 and by this plate again to the plate part 150—and therefore also connected to the abutment area of the dual clutch 10. The radially outer area of the transmission lever arrangement 63 is supported by way of a wear take-up device 78 on the housing part 12b, whereas it is supported against the pressure plate 58, that is, against the force-transmitting element 72 which transmits the engaging force to the pressure plate 58, at a point radially farther toward the inside. Here, too, when wear occurs in the area of the clutch disk 42, the position of the pressure plate 58 shifts, but the transmission lever arrangement 63 also shifts in the axial direction, thus basically retaining its installation position. Now a corresponding adjustment is required in the area of the actuator device 76.

The two wear take-up devices 66, 78 described above can be of conventional design, as described above; they can therefore have at least one adjusting element such as an adjusting ring, which, upon the occurrence of wear, can move in the circumferential direction under the pretension of a spring element, and which can shift axially as the result of a ramp or wedge effect or which can induce an axial displacement of some other component.

What is claimed is:

1. A multiple clutch arrangement, comprising:
a housing arrangement connectable to a drive element for rotation therewith about an axis of rotation;
a first clutch area including a first pressure plate arranged in said housing arrangement for rotation therewith about the axis of rotation, a first abutment area, and a first clutch disk having a first friction area arranged between said first pressure plate and said first abutment area, said first pressure plate being axially movable toward said first abutment area for pressing said first friction area against said abutment, a first actuator device acting on said first clutch area, and a first transmission lever arrangement connected to said first actuator device; and
a second clutch area including a second pressure plate arranged in said housing arrangement for rotation therewith about the axis of rotation, a second abutment area, and a second clutch disk having a second friction area arranged between said second pressure plate and said second abutment area, said second pressure plate being axially movable toward said second abutment area for pressing said second friction area against said second abutment area, a second actuator device acting on said second clutch area, and a second transmission lever arrangement connected to said second actuator device,
wherein at least one of said first and second actuator devices is operatively arranged for producing an actuating force acting in a clutch-engaging direction in a corresponding one of said first and second clutch areas, one end of each of said first and second transmission lever arrangements is supported against said housing arrangement and another end of said first and second transmission lever arrangements is supported against the corresponding one of said first and second pressure plates, and said housing arrangement comprises an inside surface and an outside surface, one of said first and second transmission lever arrangements being supported against said inside surface of said housing arrangement and the other one of said first and second transmission lever arrangements being supported against said outside surface of said housing arrangement.

2. The clutch arrangement of claim 1, wherein at least one of the first and second clutch areas comprises a wear take-up device, said corresponding one of said first and second actuator devices acts on an associated one of said first and second pressure plates by said wear take-up device.

3. A multiple clutch arrangement, comprising:
a housing arrangement connectable to a drive element for rotation therewith about an axis of rotation;
a first clutch area including a first pressure plate arranged in said housing arrangement for rotation therewith about the axis of rotation, a first abutment area, and a first clutch disk having a first friction area arranged between said first pressure plate and said first abutment area, said first pressure plate being axially movable toward said first abutment area for pressing said first friction area against said abutment, a first actuator device acting on said first clutch area, and a first transmission lever arrangement connected to said first actuator device; and
a second clutch area including a second pressure plate arranged in said housing arrangement for rotation therewith about the axis of rotation, a second abutment area, and a second clutch disk having a second friction area arranged between said second pressure plate and said second abutment area, said second pressure plate being axially movable toward said second abutment area for pressing said second friction area against said second abutment area, a second actuator device acting on said second clutch area, and a second transmission lever arrangement connected to said second actuator device,
wherein at least one of said first and second actuator devices is operatively arranged for producing an actuating force acting in a clutch-engaging direction in a corresponding one of said first and second clutch areas, one end of each of said first and second transmission lever arrangements is supported against said housing arrangement and another end of said first and second transmission lever arrangements is supported against the corresponding one of said first and second pressure plates, said first transmission lever arrangement is supported against said housing arrangement in an area radially outside the point where said first transmission lever arrangement is supported against said first pressure plate, and said second transmission lever arrangement is supported against said housing arrangement in an area radially inside or radially outside the point where said second transmission lever arrangement is supported against said second pressure plate, and said housing arrangement comprises an inside surface and an outside surface, wherein said first transmission lever arrangement is supported against said inside surface and said second transmission lever arrangement is supported against said outside surface.

4. A multiple clutch arrangement, comprising:
a housing arrangement connectable to a drive element for rotation therewith about an axis of rotation;
a first clutch area including a first pressure plate arranged in said housing arrangement for rotation therewith about the axis of rotation, a first abutment area, and a first clutch disk having a first friction area arranged between said first pressure plate and said first abutment area, said first pressure plate being axially movable toward said first abutment area for pressing said first friction area against said abutment, a first actuator device acting on said first clutch area, and a first transmission lever arrangement connected to said first actuator device;
a second clutch area including a second pressure plate arranged in said housing arrangement for rotation therewith about the axis of rotation, a second abutment area, and a second clutch disk having a second friction area arranged between said second pressure plate and said second abutment area, said second pressure plate being axially movable toward said second abutment area for pressing said second friction area against said second abutment area, a second actuator device acting on said second clutch area, and a second transmission lever arrangement connected to said second actuator device,
wherein at least one of said first and second actuator devices is operatively arranged for producing an actuating force acting in a clutch-engaging direction in a corresponding one of said first and second clutch areas, one end of each of said first and second transmission lever arrangements is supported against said housing arrangement and another end of said first and second transmission lever arrangements is supported against the corresponding one of said first and second pressure plates, and said housing arrangement has a first housing area connectable to the drive element, and a second housing area designed to support at least one of said first and second transmission lever arrangements; and
an abutment plate providing said first and second abutment areas for said first and second clutch areas, said abutment plate being connected to said first and second housing areas.

5. A multiple clutch arrangement, comprising:
a housing arrangement connectable to a drive element for rotation therewith about an axis of rotation;
a first clutch area including a first pressure plate arranged in said housing arrangement for rotation therewith about the axis of rotation, a first abutment area, and a first clutch disk having a first friction area arranged between said first pressure plate and said first abutment area, said first pressure plate being axially movable toward said first abutment area for pressing said first friction area against said abutment, and a first actuator device acting on said first clutch area; and
a second clutch area including a second pressure plate arranged in said housing arrangement for rotation therewith about the axis of rotation, a second abutment area, and a second clutch disk having a second friction area arranged between said second pressure plate and said second abutment area, said second pressure plate being axially movable toward said second abutment area for pressing said second friction area against said second abutment area, and a second actuator device acting on said second clutch area,
wherein at least one of said first and second actuator devices is operatively arranged for producing an actuating force acting in a clutch-engaging direction in a corresponding one of said first and second clutch areas, and wherein said first pressure plate is operated on by said first actuator device in a first direction and said second pressure plate is operated on by said second actuator device in a second direction, said first and second directions comprising opposing axial directions.

6. The clutch arrangement of claim 5, wherein said first clutch area comprises a first transmission lever arrangement connected to said first actuator device, said second clutch area comprises a second transmission lever arrangement connected to said second actuator device, and one end of each of said first and second transmission lever arrangements is supported against said housing arrangement and another end of said first and second transmission lever arrangements is supported against the corresponding one of said first and second pressure plates.

7. The clutch arrangement of claim 6, wherein said first transmission lever arrangement is supported against said housing arrangement in an area radially outside the point where said first transmission lever arrangement is supported against said first pressure plate, and said second transmission lever arrangement is supported against said housing arrangement in an area radially inside or radially outside the point where said second transmission lever arrangement is supported against said second pressure plate.

8. A multiple clutch arrangement, comprising:
a housing arrangement connectable to a drive element for rotation therewith about an axis of rotation;
a first clutch area including a first pressure plate arranged in said housing arrangement for rotation therewith about the axis of rotation, a first abutment area, and a first clutch disk having a first friction area arranged between said first pressure plate and said first abutment area, said first pressure plate being axially movable toward said first abutment area for pressing said first friction area against said abutment, and a first actuator device acting on said first clutch area; and
a second clutch area including a second pressure plate arranged in said housing arrangement for rotation therewith about the axis of rotation, a second abutment area, and a second clutch disk having a second friction area arranged between said second pressure plate and said second abutment area, said second pressure plate being axially movable toward said second abutment area for pressing said second friction area against said second abutment area, and a second actuator device acting on said second clutch area,
wherein at least one of said first and second actuator devices is operatively arranged for producing an actuating force acting in a clutch-engaging direction in a corresponding one of said first and second clutch areas, and wherein said first pressure plate is operated on by said first actuator device in a first direction and said second pressure plate is operated on by said second actuator device in a second direction, said first and second directions comprising the same axial direction,
wherein said first clutch area comprises a first transmission lever arrangement connected to said first actuator device, said second clutch area comprises a second transmission lever arrangement connected to said second actuator device, and one end of each of said first and second transmission lever arrangements is supported against said housing arrangement and another end of said first and second transmission lever arrangements is supported against the corresponding one of said first and second pressure plates, and
wherein said first transmission lever arrangement is supported against said housing arrangement in an area radially outside the point where said first transmission lever arrangement is supported against said first pressure plate, and said second transmission lever arrangement is supported against said housing arrangement in an area radially inside or radially outside the point where said second transmission lever arrangement is supported against said second pressure plate.

9. A multiple clutch arrangement, comprising:
a housing arrangement connectable to a drive element for rotation therewith about an axis of rotation;
a first clutch area including a first pressure plate arranged in said housing arrangement for rotation therewith about the axis of rotation, a first abutment area, and a first clutch disk having a first friction area arranged between said first pressure plate and said first abutment area, said first pressure plate being axially movable toward said first abutment area for pressing said first friction area against said abutment, and a first actuator device acting on said first clutch area; and
a second clutch area including a second pressure plate arranged in said housing arrangement for rotation therewith about the axis of rotation, a second abutment area, and a second clutch disk having a second friction area arranged between said second pressure plate and said second abutment area, said second pressure plate being axially movable toward said second abutment area for pressing said second friction area against said second abutment area, and a second actuator device acting on said second clutch area,
wherein at least one of said first and second actuator devices is operatively arranged for producing an actuating force acting in a clutch-engaging direction in a corresponding one of said first and second clutch areas, and wherein at least one of the first and second clutch areas comprises a wear take-up device, said corresponding one of said first and second actuator devices acts on an associated one of said first and second pressure plates by said wear take-up device, said wear take-up device comprising:
at least one adjusting element which is movable relative to the associated on of said first and second pressure plates during a wear take-up process;
a first detection element connected to said housing arrangement such that said first detection element is stationary relative to said housing arrangement;
a second detection element mounted on the associated one of said first and second pressure plates and which, upon the occurrence of wear, is deflectable outward relative to the associated one of said first and second pressure plates by cooperation with said first detection element; and
an arresting element operatively arranged for locking said second detection element in its wear-induced, deflected position relative to the associated one of said first and second pressure plates, said arresting element being movable relative to the associated one of said first and second pressure plates and relative to said second detection element in response to the occurrence of wear and thus upon the deflection of said second detection element, and wherein an adjusting movement of said at least one adjusting element is limited by at least one of said second detection element and said arresting element.

10. The clutch arrangement of claim 9, wherein said second detection element comprises a leaf spring having one end attached to the associated one of said first and second pressure plates.

11. The clutch arrangement of claim 9, wherein said second detection element is operatively arranged such that at least a portion of a length of said second detection element is moved away from the associated one of said first and second pressure plates upon the occurrence of wear, said arresting element being wedge-shaped, and, said wedge-shaped arresting element being pretensioned into an intermediate space formed between the associated one of said first and second pressure plates and the at least a portion of said second detection element.

12. The clutch arrangement of claim 9, wherein said at least one adjusting element comprises an adjusting ring rotatable relative to the associated one of said first and second pressure plates around the axis of rotation during a wear take-up operation.

13. The clutch arrangement of claim 9, wherein said first clutch area comprises a first transmission lever arrangement connected to said first actuator device, said second clutch area comprises a second transmission lever arrangement connected to said second actuator device, and one end of each of said first and second transmission lever arrangements is supported against said housing arrangement and another end of said first and second transmission lever arrangements is supported against the corresponding one of said first and second pressure plates.

14. The clutch arrangement of claim 13, wherein said first transmission lever arrangement is supported against said housing arrangement in an area radially outside the point where said first transmission lever arrangement is supported against said first pressure plate, and said second transmission lever arrangement is supported against said housing arrangement in an area radially inside or radially outside the point where said second transmission lever arrangement is supported against said second pressure plate.

15. The clutch arrangement of claim 14, wherein said second clutch area comprises at least one transmission element, said second transmission lever arrangement being supported against said second pressure plate by said at least one transmission element.

16. The clutch arrangement of claim 13, wherein said housing arrangement has a first housing area connectable to the drive element, and a second housing area designed to support at least one of said first and second transmission lever arrangements.

* * * * *

UNITED STATES PATENT AND TRADEMARK OFFICE
CERTIFICATE OF CORRECTION

PATENT NO.        : 7,080,722 B2
APPLICATION NO. : 10/491029
DATED             : July 25, 2006
INVENTOR(S)       : Sebastian Vogt It is certified that error appears in the above-identified patent and that said Letters Patent is hereby corrected as shown below:

Title Page, under item [86]
Replace the PCT No. and §371(c)(1), (2), (4) Date on the title page with the following:

(86)    PCT No.:    PCT/EP02/10878

§ 371(c)(1),
              (2), (4) Date: Mar. 26, 2004

Signed and Sealed this

Sixth Day of March, 2007

JON W. DUDAS
*Director of the United States Patent and Trademark Office*